(No Model.)

N. HEMENWAY.
METAL PACKING.

No. 331,056.  Patented Nov. 24, 1885.

WITNESSES:
Robert Kirk

INVENTOR:
Nathan Hemenway
By
Attorney.

UNITED STATES PATENT OFFICE.

NATHAN HEMENWAY, OF PARMA, OHIO.

METAL PACKING.

SPECIFICATION forming part of Letters Patent No. 331,056, dated November 24, 1885.

Application filed March 27, 1885. Serial No. 160,227. (No model.)

*To all whom it may concern:*

Be it known that I, NATHAN HEMENWAY, of Parma, in the county of Cuyahoga and State of Ohio, have invented a new and useful Improvement in Metal Packings, which improvement is fully set forth in the following specification and accompanying drawings, in which—

Figure 1:
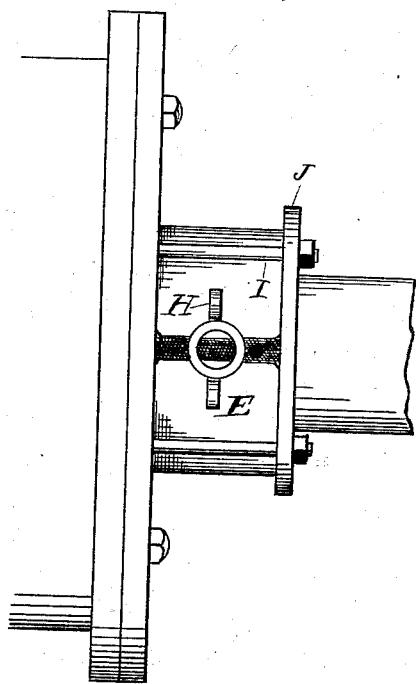
Figure 2:
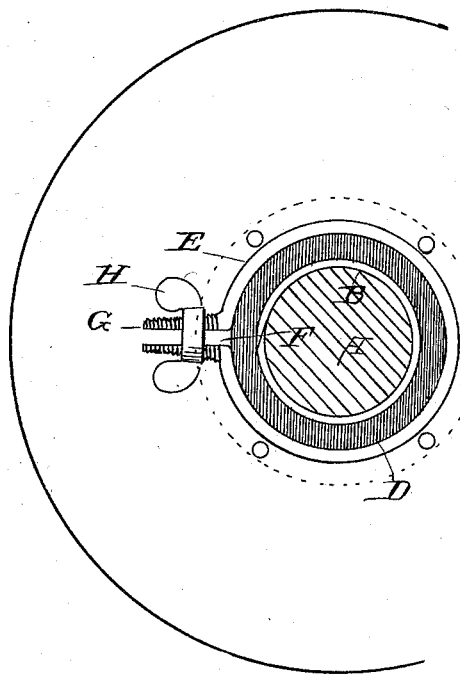

Figure 1 is a section of a cylinder-head and piston-rod having thereon my improved metal packing, and Fig. 2 is a transverse section of my improved metal packing device.

The present device relates to an improvement in metal packing, consisting of inner and outer tubes, and between them a lining of rubber or other suitable material, the inner tube slotted, so as to be compressible upon the rod, and the outer shell provided with a cone-shaped threaded extension, and having a set-screw thereon, by means of which the outer shell can be contracted, thus pressing the rubber packing and inner shell upon the piston-rod, thus making an effectual packing, all of which will now be fully set forth in detail.

In the accompanying drawings, A is a piston-rod, having outwardly a section of metal tubing, B, one part of which is provided with an opening, C, formed either with the edges square and near adjoining or formed wedge-shaped and overlapping, as shown in Fig. 2. Outwardly from this tube B, I provide a section of rubber tube, D, closely embracing said tubing B, and outwardly of the tubing D another section of metal tubing, E, formed somewhat heavier than the inner tube, B. This external metallic tube or shell, E, is provided with an elongated slot, F, with the edges centrally turned up opposite each other, as shown in Fig. 2, forming semi-cone-shaped lugs G, and threaded externally, so that a thumb-nut, H, when placed thereon, may operate inwardly and outwardly, so as to contract and expand the shell E. When this nut H is unscrewed outwardly from the shell, the inner tube, B, will press but lightly upon the periphery of the piston-rod; but when the said thumb-nut is screwed down toward the shell E, and thus contracted, the opening E or rubber tube D is also contracted, and at the same time contracts the inner metal tube, B, which, clasping the piston-rod, acts efficiently as a packing. One end of one of these sections of packing is placed against the head of the pump or engine upon the piston-rod and bolted in position by means of rods I, passing through the outer rim of the head J on the outer end of the section of packing, as shown in Fig. 1. The opening centrally within the head J is designed to be somewhat larger than the piston-rod.

When the metal tubing B becomes worn, the bolts or rods I may be removed and the packing detached from its position, when the said tubing B may be replaced by a new one.

When this device is designed to be for an oil-pump, or when there is much heat coming in contact therewith, I use vulcanized material in place of the rubber.

What I claim is—

1. In a metal packing, an inner metal tube formed with a slot at one side, so as to be compressible, and having outwardly rubber tubing inclosed within a metal tube, and so disposed as to be easily contracted by means of a thumb-nut engaging with semi-cone-shaped threaded lugs extending outwardly from the opposite wings, substantially as herein set forth.

2. The combination of a series of compressible tubes, the inner and outer formed of metal, and between them a compressible vulcanized material adjusted to any desired tension upon the piston-rod by means of a set-screw, the whole arranged as and for the purposes substantially as herein set forth.

In testimony that I claim the foregoing I have hereunto set my hand, this 18th day of March, 1885, in the presence of witnesses.

NATHAN HEMENWAY.

Witnesses:
ARTHUR HEMENWAY,
WM. H. KEES.